Patented Apr. 15, 1924.

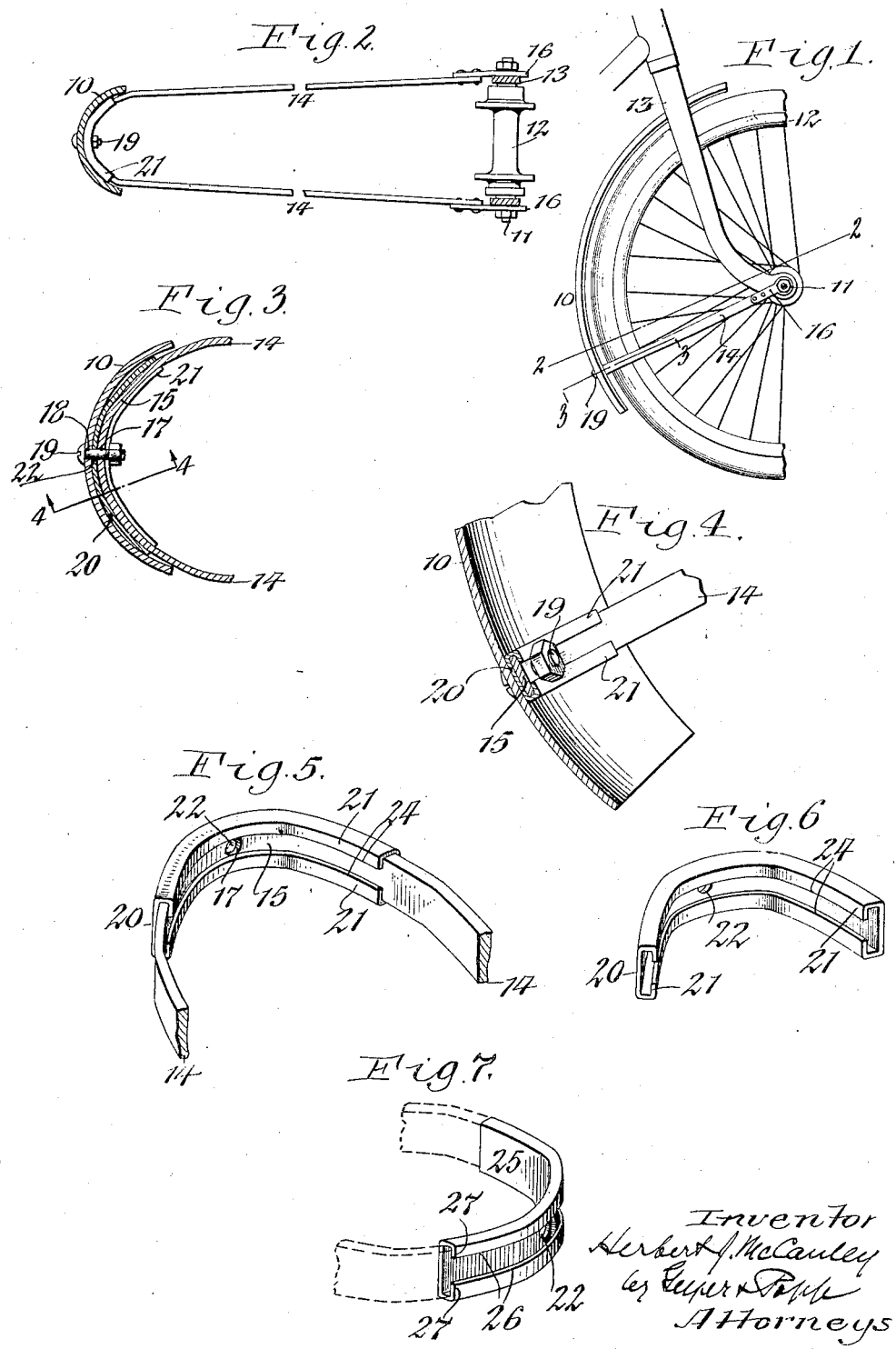

1,490,534

UNITED STATES PATENT OFFICE.

HERBERT J. McCAULEY, OF BUFFALO, NEW YORK.

MUD-GUARD BRACE.

Application filed May 14, 1921. Serial No. 469,490.

*To all whom it may concern:*

Be it known that I, HERBERT J. MCCAULEY, a citizen of the United States, residing in Buffalo, in the county of Erie and State of New York, have invented new and useful Improvements in Mud-Guard Braces, of which the following is a specification.

This invention relates to a brace for the mud guards of bicycles and the like and has for its purpose the production of a brace of this character which is reinforced in a simple, efficient and inexpensive manner at the cross piece or bow thereof, so that the same is more durable and not liable to be broken at its point of connection with the mud guard.

In the accompanying drawings:

Figure 1 is a fragmentary side elevation showing the front mud guard of a bicycle equipped with my improved brace. Figure 2 is a horizontal section of the same on line 2—2, Fig. 1. Figure 3 is a fragmentary section, on an enlarged scale, taken on line 3—3, Fig. 1. Figure 4 is a fragmentary vertical section taken on line 4—4, Fig. 3. Figure 5 is a fragmentary perspective view of the mud guard brace equipped with the form of reinforcement for its cross piece shown in Figs. 1–4. Figure 6 is a similar view of the reinforcement detached. Figure 7 is a similar view showing a modified form of reinforcement.

Similar characters of reference refer to like parts throughout the several views.

Although this improved mud guard brace can be installed in various ways the same is shown in Fig. 1 employed in a bicycle for supporting the lower end of the front channel shaped mud guard 10 on opposite ends of the axle 11 of the front or steering wheel 12, said axle being mounted on the lower arms of a steering fork 13 and the upper part of the latter being connected with the upper part of the mud guard.

The mud guard brace is provided with two longitudinal side bars 14 arranged along opposite sides of the wheel, a curved or bow shaped cross piece 15 connecting the outer ends of said bars and arranged adja50 cent to the inner or concave side of said mud guard, said bars and cross piece being constructed of a single strip of metal. At the inner ends of said bars the same are provided with eyes 16 which are connected with opposite ends of the axle 11 in any approved manner.

In the central part of the bow or cross piece of the brace the same is provided with an opening 17 which is in line with an opening 18 in the mud guard, said openings receiving a bolt 19 whereby the mud guard and brace are connected.

It has been found in practice that the brace is liable to crack, break or split crosswise in line with the opening 17 therein due to the constant vibration to which the wheel is subjected, thereby releasing the guard and permitting the same to flop around and not only fail to perform its function but also produce a rattling noise. To obviate this a reinforcement is applied to the cross piece or bow of the brace which in the form shown in Figs. 1–6, comprises a curved longitudinal web 20 engaging with one side of the bow or cross piece and two longitudinal channel shaped flanges 21 arranged at opposite longitudinal edges of said web and receiving the opposite longitudinal edges of the bow or cross piece. The reinforcement is of substantially the same form as said bow and embraces the same tightly so that the same are practically one piece and are not liable to be broken under the severest strain to which the same may be subjected in actual use.

The web and flanges of the reinforcement are constructed of a single sheet of metal and the central part of the web is provided with an opening 22 which receives the fastening bolt 19.

In the construction of the reinforcement shown in Figs. 1–6, the web 20 of the same in on the outer side of the bow of the brace and a longitudinal slit 24 is formed between its flanges 21 on the inner side of the cross piece, while in Fig. 7 the web 25 is arranged on the inner side of said bow and a longitudinal slit 26 is formed between its flanges 27 on the outer side of the bow or cross piece as shown in Fig. 7. The edges of the flanges may be brought close together so that the reinforcement practically forms a tube which completely surrounds the bow of the brace. In either form the reinforcement materially stiffens the brace and prevents the latter from breaking next to the bolt which fastens the mud guard and brace together.

In the manufacture of the brace with the reinforcement the latter is first made in the form of a straight tube which is slipped over the brace from one end of the same while it is still in a straight condition after the tubular reinforcement has been placed midway of the length of the strip of metal from which the brace is to be made, the latter together with the reinforcement mounted thereon are operated upon by suitable dies, so that the reinforcement and that part of the brace strip embraced thereby are bent into substantially bow shaped form and the side bars or arms of the brace are arranged parallel and give the brace as a whole a U-shaped form. When thus applied to the brace the reinforcement is preferably rigid and immovable on the brace and strengthens the latter adjacent to its bolt hole 17 so that a fracture at this place is not liable to occur.

I claim as my invention:

1. A mud guard brace having two longitudinal side bars and a cross piece connecting the outer ends of said bars, and a reinforcement having a longitudinal web engaging one side of said cross piece, and two channel shaped flanges arranged at the longitudinal edges of said web and engaging the opposite longitudinal edges of said cross piece.

2. A mud guard brace having two longitudinal side bars and a cross piece connecting the outer ends of said bars, and a reinforcement having a longitudinal web engaging one side of said cross piece, and two channel shaped flanges arranged at the longitudinal edges of said web and engaging the opposite longitudinal edges of said cross piece, and said web being provided with a bolt opening which registers with a corresponding opening in said cross piece.

HERBERT J. McCAULEY